(12) United States Patent
Raven et al.

(10) Patent No.: US 9,971,102 B2
(45) Date of Patent: May 15, 2018

(54) FIBRE OPTIC CABLE ASSEMBLY

(71) Applicant: FibreFab Limited, Milton Keynes (GB)

(72) Inventors: Asher Raven, Milton Keynes (GB); Alan Keizer, Beachampton (GB)

(73) Assignee: FibreFab Limited (GB)

( * ) Notice: Subject to any disclaimer, the term of this patent is extended or adjusted under 35 U.S.C. 154(b) by 0 days. days.

(21) Appl. No.: 14/874,935

(22) Filed: Oct. 5, 2015

(65) Prior Publication Data
US 2016/0327756 A1    Nov. 10, 2016

(30) Foreign Application Priority Data

May 6, 2015 (GB) .................... 1507758.9

(51) Int. Cl.
G02B 6/38 (2006.01)

(52) U.S. Cl.
CPC ......... *G02B 6/3893* (2013.01); *G02B 6/3831* (2013.01); *G02B 6/3878* (2013.01); *G02B 6/3898* (2013.01); *G02B 6/3879* (2013.01)

(58) Field of Classification Search
CPC ............................... G02B 6/38; G02B 6/3893
USPC ......................................................... 385/86
See application file for complete search history.

(56) References Cited

U.S. PATENT DOCUMENTS

| | | | | |
|---|---|---|---|---|
| 5,386,487 A | * | 1/1995 | Briggs et al. | 385/59 |
| 5,638,474 A | * | 6/1997 | Lampert et al. | 385/78 |
| 5,647,043 A | * | 7/1997 | Anderson et al. | 385/78 |
| 6,017,154 A | * | 1/2000 | Carlisle et al. | 385/86 |
| 6,024,498 A | * | 2/2000 | Carlisle et al. | 385/56 |
| 6,186,670 B1 | * | 2/2001 | Austin et al. | 385/55 |
| 6,217,226 B1 | * | 4/2001 | Gibbs et al. | 385/53 |
| 7,588,373 B1 | * | 9/2009 | Sato et al. | 385/53 |
| 8,152,385 B2 | | 4/2012 | de Jong et al. | |
| 2002/0090177 A1 | * | 7/2002 | Anderson et al. | 385/60 |
| 2004/0008494 A1 | * | 1/2004 | Roth | 361/736 |
| 2008/0112673 A1 | * | 5/2008 | Kanou et al. | 385/78 |
| 2008/0131055 A1 | * | 6/2008 | Parkman et al. | 385/58 |
| 2009/0047818 A1 | * | 2/2009 | Irwin et al. | 439/304 |
| 2010/0081303 A1 | * | 4/2010 | Roth et al. | 439/140 |

(Continued)

FOREIGN PATENT DOCUMENTS

| | | |
|---|---|---|
| TW | M486778 U | 9/2014 |
| WO | WO 2010/099141 A1 | 9/2010 |
| WO | WO 2013/013016 A1 | 1/2013 |

OTHER PUBLICATIONS

International Search Report dated Aug. 2, 2016 for International application No. PCT/GB2016/051278.

(Continued)

*Primary Examiner* — Kaveh C Kianni
(74) *Attorney, Agent, or Firm* — Fay Sharpe LLP

(57) ABSTRACT

A fiber optic cable assembly (1), including: at least one fiber optic connector (45a,45b) arranged for insertion into a receiving socket, said connector (45a,45b) including a leading end and a trailing end; at least one latch (55a,55b) for releasably locking the fiber optic connector (45a,45b) to the receiving socket, said latch (55a,55b) including a leading end (63a,63b) and a trailing end (65a,65b), wherein the latch (55a,55b) is cantilevered towards its trailing end (65a,65b); and a manually operable control (69) arranged for sliding movement, said control (69) being arranged to actuate the latch (55a,55b) in response to a user actuating the control (69).

39 Claims, 11 Drawing Sheets

(56) References Cited

U.S. PATENT DOCUMENTS

| | | |
|---|---|---|
| 2010/0220961 A1* | 9/2010 | de Jong et al. ............... 385/77 |
| 2010/0320755 A1* | 12/2010 | Williams et al. ............ 285/355 |
| 2011/0229098 A1* | 9/2011 | Abernathy et al. .......... 385/102 |
| 2011/0299814 A1* | 12/2011 | Nakagawa ..................... 385/78 |
| 2012/0033922 A1* | 2/2012 | Nakagawa ..................... 385/78 |
| 2012/0308183 A1* | 12/2012 | Irwin et al. .................... 385/56 |
| 2013/0216188 A1* | 8/2013 | Lin et al. ....................... 385/77 |
| 2014/0133808 A1* | 5/2014 | Hill et al. ...................... 385/81 |
| 2014/0153875 A1* | 6/2014 | Bradley et al. ................ 385/60 |
| 2014/0169727 A1* | 6/2014 | Veatch et al. .................. 385/11 |
| 2014/0205257 A1* | 7/2014 | Durrant et al. .............. 385/139 |
| 2015/0177463 A1* | 6/2015 | Lee et al. |
| 2015/0277067 A1* | 10/2015 | Droesbeke ..................... 385/77 |
| 2015/0293318 A1* | 10/2015 | Droesbeke et al. .......... 385/140 |
| 2015/0323110 A1* | 11/2015 | Trivett et al. ................ 385/140 |

OTHER PUBLICATIONS

Written Opinion dated Aug. 2, 2016 for International application No. PCT/GB2016/051278.
British Search Report dated Jul. 13, 2015 for Application No. GB1507758.9
European Search Report dated Sep. 14, 2016 for Application No. EP 16 16 8472.

* cited by examiner

SECTION B-B
- Latched

FIBRE OPTIC CABLE ASSEMBLY

CROSS REFERENCE TO RELATED APPLICATION

This application claims foreign priority under 35 USC 119 to British application no. GB 1507758.9 filed May 6, 2015.

FIELD

The present invention relates to a fibre optic cable assembly.

BACKGROUND

Fibre optic cable assemblies typically include at least one fibre optic connector having a locking lever for releasably attaching the cable assembly to a patch panel or adaptor, and the patch panel or adapter includes at least one complementary socket for receiving the connector.

Typically patch panels include many receiving sockets (for example, tens or hundreds), and cable assemblies can be plugged into each available socket. When many cable assemblies are plugged into the sockets, it can be difficult for a user to manually remove the cable assemblies. This is because patch panels provide high density packing, which means there is limited space around each cable assembly. Thus it can be difficult for a user to manipulate the locking lever(s) of any given connector when removing that cable assembly from the panel, due to the interference of adjacent cable assemblies.

U.S. Pat. No. 8,152,385 and US 2011/0299814 have each addressed this problem by providing arrangements having two connector bodies, locking levers attached to front portion of the respective connector bodies, and an actuator lever that is arranged to actuate the locking levers simultaneously. The actuator lever is separate from the locking levers and is attached to an upper surface of a connector body. While this provides a reasonably satisfactory means of actuation for the specific arrangements disclosed, it is still necessary for the user to position his finger relatively close to the locking levers in order to operate the actuator lever, and the user is required to push downwards on the actuator, which limits the packing density that can be achieved.

Thus there is a desire to provide a fibre optic cable assembly that includes an improved means of actuating the fibre optic connector locking levers, and which can be used in patch panels having a high packing density.

Furthermore, it is desirable to provide a fibre optic cable assembly that is easy to manufacture and assemble, in order to reduce production costs, since such devices are often produced in relatively large quantities.

In data communications systems fibre optic cables having a plurality of fibre optic cables are frequently used to connect between communications nodes. Typically the fibre optic cable assembly includes a pair of optical fibres, one for transmitting and one for receiving (typically the receiving fibre is labelled A and the transmitting fibre is labelled B). The overall net effect of the data communications cabling is that the transmitting cables B have to connect with receiving ports A, and receiving cables A have to connect with transmitting ports B. However, during installation, it is not uncommon for the installers to get confused between the transmitting and receiving cables and a cross over can occur such that the transmitting cables B are not connected with receiving port A, and vice versa. For many connector types, installers are prevented from simply unplugging the duplex cable connectors and reinserting them in another orientation because the connectors are uni-directional and therefore can only be inserted into the complementary receiving ports in one orientation. Thus it is necessary for the installer to replace the existing cable or remove the connecting head from the fibres and effectively remanufacture the cable on site, which is very cumbersome and time consuming.

Thus it is desirable to provide a fibre optic cable assembly that is capable of changing polarity in a simple manner.

While these problems mainly occur in the data communications industry, the invention also has applicability to telecommunications industry, and any other situation where fibre optic cables are connected together.

SUMMARY

Accordingly the present invention seeks to provide a fibre optic cable assembly that mitigates at least one of the above-mentioned problems, or at least provides an alternative to existing approaches.

According to one aspect of the invention there is provided a fibre optic cable assembly, including: at least one fibre optic connector arranged for insertion into a receiving socket, said connector having a leading end and a trailing end; at least one latch for releasably locking the fibre optic connector to the receiving socket, said latch having a leading end and a trailing end, wherein the latch is cantilevered towards its trailing end; and a manually operable control arranged for sliding movement, said control being arranged to actuate the latch in response to a user actuating the control.

The latch is moved from a locking position to a non-locking position in response to the user actuating the control. Thus the control is operated by the user in order to remove the cable assembly from a socket, for example in a patch panel or adaptor. The invention is particularly suited to high density packing arrangements, where it is difficult for the user to get access to the latches. The arrangement of having a latch cantilevered towards its trailing end, together with a control arranged for sliding movement, provides an efficient actuation arrangement. This makes it easier of the user to actuate the latch in the context of a high density patch panel.

Furthermore, the inventors have found that cantilevering the latch towards its trailing end provides an arrangement having low stress concentrations in the latch structure, when it is actuated by the sliding control. This helps to improve the longevity of the device. The arrangement also provides an arrangement, in at least some embodiments, that requires a lower load in order to actuate the at least one latch due to the increased distance of the latching points relative to the point of rotation. This assists the user when removing the device from a high density patch panel. The arrangement also provides more material towards the rear of the connectors for mounting the latches and/or the control to the assembly, which assists the manufacturing, assembly processes and stability of the assembly.

Leading and trailing ends are with reference to the direction of insertion of the connector into the receiving socket.

Advantageous optional features are disclosed in the dependent claims and statements of invention below.

The at least one latch is cantilevered at, or adjacent, the trailing end of the fibre optic connector. This ensures that there is sufficient room to accommodate a leading end of the control.

The at least one latch is cantilevered to a mounting located at, or adjacent the trailing end of the fibre optic connector. In preferred embodiments the or each latch is formed integrally with one mounting. A single mounting can be provided for all latches. Alternatively, each latch may have its own mounting.

The control is slidably attached to a mounting. In preferred embodiments the control is slidably attached to the mounting having at least one latch cantilevered thereto. This provides a very efficient arrangement for manufacturing purposes. In some embodiments, a first mounting can be provided for the control and a second mounting can be provided for the or each latch.

The control is slidably attached to the mounting at a level below the level at which the or each latch is cantilevered to the mounting.

The control includes a driving surface, which is arranged to depress the at least one latch in response to a user actuating the control. The driving surface is located above the at least one latch. The driving surface acts on an upper surface of the or each latch. The driving surface engages a portion of the latch located towards the trailing end of the latch. The driving surface moves relative to the or each latch to actuate the latch. The driving surface can have any suitable shape. For example, it can include at least one of a planar portion and a curved region portion.

The driving surface is located at, or adjacent to, a leading end of the control. The driving surface is arranged substantially transversely to the at least one latch. The driving surface includes first and second ends, which extend beyond the width of the or each latch. The control includes a body and the driving surface is attached to the body at, or adjacent, the first and second ends of the driving surface. This arrangement copes with the reaction forces generated by the resilient latches when the control is actuated. In preferred embodiments the body and driving surface are part of the same integrated component, for example, the control can comprise a single moulded component.

The control is slidably attached to the mounting at a level below the level at which the driving surface engages the latch.

The control is releasably attachable to the mounting. This provides a very convenient construction, particularly for assembly purposes. For embodiments having a control that is releasably attachable to the mounting, it is preferred that the control is slidably attached to the mounting at a level below the level at which the or each latch is cantilevered to the mounting. This together with the driving surface being mounted above the or each latch, helps to prevent the control from separating from the mounting.

One of the control and the mounting includes at least one recess, such as at least one slot, and the other of the control and the mounting includes at least one formation, such as at least one rib. The recess and formation interact to provide guided sliding movement of the control relative to the mounting. In some embodiments one of the control and the mounting includes a plurality of recesses and the other of the control and the mounting includes a plurality of formations. In some embodiments the mounting includes a plurality of recesses and the control includes a plurality of formations located within the recesses. Preferably the recesses are arranged substantially opposite to one another. Preferably the formations are arranged substantially opposite to one another.

The mounting includes at least one downwardly facing engagement surface that is arranged to engage with an upper surface of the manually operable control. The interaction between the surfaces guides movement of the control, and helps to prevent the control from separating from the mounting.

The control includes a slot-shaped through hole. This enables the control to be mounted onto the mounting.

At least a part of the mounting protrudes through the slot-shaped through hole.

The slot-shaped through hole includes first and second portions. The width of the first portion is greater than the width second portion.

The control is mounted onto the mounting via the first portion of the slot-shaped through hole.

Edge portions of the slot shaped through hole engage with recesses formed in the mounting. The sliding interaction between the control and the mounting is provided by edge portions of the slot-shaped through hole sliding within the recesses, and preferably edge portions of the second portion of the slot-shaped hole.

The driving surface is offset from the plane of the slot-shaped through hole.

The second portion of the slot-shaped hole is located towards a leading end of the control. The first portion is located towards a trailing end of the control. In preferred embodiments, a leading end of the manually operable control engages the latch(es). A portion of the control between the leading end and the mid-point in a longitudinal direction engages the mounting. A portion between the mid-point and a trailing end of the control is provided for a user to grip.

The manually operable control is arranged to slide in a direction that is substantially parallel with at least one of a longitudinal axis of the fibre optic cable assembly and an insertion axis of the fibre optic cable assembly.

The manually operable control is movable in a direction that is substantially opposite to the insertion direction in order to move the latch to a non-locking position. The manually operable control is arranged to slide between a first position wherein the or each latch is in a locking position, and a second position wherein the or each latch is in a non-locking position. The manually operable control is arranged to slide in a direction away from the or each latch when moving to the second position.

Sliding movement of the manually operable control is limited by the interaction of the manually operable control and the or each latch, preferably in the unlocking direction.

The at least one latch is resilient, and the resiliency of the at least one latch urges the manually operable control towards the non-locking position.

The or each latch is inclined from the cantilevered end towards the fibre optic connector. This avoids snagging on insertion. Thus a perpendicular distance from a central longitudinal axis of the connector is greater at the cantilevered end of the latch than at the free end.

The or each fibre optic connector includes a guide element located towards its leading end. The guide element interacts with a socket receiving formation such as at least one of a slot and recess, and guides onward insertion of the fibre optic connector, including the latch, ensuring the correct location and/or orientation of the connector with respect to the socket.

The assembly includes a second fibre optic connector and a second latch. The second latch includes a leading end and a trailing end, and is cantilevered towards its trailing end. The second latch is arranged for releasably locking the second fibre optic connector to a second receiving socket. The second latch is cantilevered at, or adjacent, the trailing end of the second fibre optic connector.

The control is arranged to move each of the first and second latches from a locking position to a non-locking position in response to a user actuating the control. Each latch is depressed by the driving surface when the control is actuated. The driving surface extends transversely across each latch, and preferably an upper surface of each latch.

The assembly includes a connector unit which connects the first and second fibre optic connectors together.

In some embodiments the or each fibre optic connector is fixedly attached to, or formed integrally with, the connector unit. Thus the connector unit and fibre optic connectors form a unitary structure.

The connector unit includes an internal cavity. The connector unit includes at least one opening in its trailing end. This enables fibre optic cables to be threaded through the connector unit from the rear, into the or each fibre optic connector. Preferably each fibre terminates with a ferrule, and the ferrule protrudes from its respective fibre optic connector.

The or each latch is cantilevered to the connector unit. In preferred embodiments the connector unit includes the at least one mounting and the or each lever is cantilevered to the at least one mounting. Preferably the or each latch is cantilevered to an upper part of the connector unit.

The control is slidably attached to the connector unit. In preferred embodiments the connector unit includes the at least one mounting and the control is slidably attached to the mounting. Preferably the control is slidably attached to an upper part of the connector unit.

The assembly includes a housing assembly comprising a housing, a first inner body, and a second inner body. A fibre optic cable is attached to the housing. Fibres from the cable are furcated within the housing such that at least one fibre is located in the first inner body and at least one fibre is located in the second inner body.

The connector unit is releasably attachable to the housing assembly in at least first and second orientations. The connector unit provides an outer casing to at least part of the housing assembly.

In the first orientation the first connector is mounted over the first inner body and the second connector is mounted over the second inner body, thereby providing the first and second connectors with a first polarity with respect to the fibres in the first and second inner bodies.

In the second orientation the first connector is mounted over the second inner body and the second connector is mounted over the first inner body, thereby providing the first and second connectors with a second polarity with respect to the fibres in the first and second inner bodies. The second polarity is different from the first polarity.

In some embodiments the or each fibre optic connector is releasably attachable to the connector unit.

For example, the assembly can include a first fibre optic cable sub-assembly, which includes a first fibre optic cable and the first fibre optic connector. The assembly includes a second fibre optic cable sub-assembly, which includes a second fibre optic cable and the second fibre optic connector.

The connector unit is arranged to releasably connect the cable sub-assemblies together.

The connector unit includes a first connector portion that is arranged to clip onto one of the first and second fibre optic cable sub-assemblies. The connector unit includes a second connector portion that is arranged to clip onto the other of the first and second fibre optic cable sub-assemblies. At least one of the first and second connector portions is arranged to snap-fit to at least one of the first and second cable sub-assemblies.

The first and second connector portions are arranged to interchangeably receive the first and second fibre optic cable sub-assemblies. This enables the polarities of the first and second cable sub-assemblies to be easily changed with respect to the connector unit.

The polarity of the first fibre optic cable sub-assembly with respect to the connector unit is adjustable by moving the first fibre optic sub-assembly from one of the first and second connector portions to the other of the first and second connector portions. The polarity of the second fibre optic cable sub-assembly with respect to the connector unit is adjustable by moving the second fibre optic sub-assembly from one of the first and second connector portions to the other of the first and second connector portions.

The connector unit clips onto at least one of the first and second fibre optic cable sub-assemblies in a direction that is substantially orthogonal to the longitudinal axis of the sub-assembly.

The connector unit is mounted substantially transverse to the longitudinal axis of at least one of the first and second fibre optic cable sub-assemblies.

According to another aspect of the invention there is provided a fibre optic cable assembly, including: a connector unit having a first fibre optic connector, a first latch for releasably locking the first connector to a first receiving socket, said first latch having a leading end and a trailing end, wherein the first latch is cantilevered towards its trailing end, a second fibre optic connector, and a second latch for releasably locking the second connector to a second receiving socket, said second latch having a leading end and a trailing end, wherein the second latch is cantilevered towards its trailing end. The assembly includes a manually operable control arranged for sliding movement with respect to the connector unit. The control is arranged to move the first and second latches from locking positions to non-locking positions in response to a user actuating the control.

According to another aspect of the invention there is provided a fibre optic cable assembly, including: a first fibre optic cable sub-assembly, including a first fibre optic cable and a first fibre optic connector; and a second fibre optic cable sub-assembly, including a second fibre optic cable and a second fibre optic connector, and a connector unit arranged to releasably attach the first and second fibre optic cable sub-assemblies together. The connector unit includes a first latch for releasably locking the first connector to a first receiving socket, said first latch having a leading end and a trailing end, wherein the first latch is cantilevered to the connector unit towards its trailing end. The connector unit includes a second latch for releasably locking the second connector to a second receiving socket, said second latch having a leading end and a trailing end, wherein the second latch is cantilevered to the connector unit towards its trailing end. The assembly includes a manually operable control arranged for sliding movement with respect to the connector unit. The control is arranged to move the first and second latches from locking positions to non-locking positions in response to a user actuating the control.

BRIEF DESCRIPTION OF THE DRAWINGS

Embodiments of the present invention will now be described, by way of example only, with reference to the accompanying drawings in which.

DETAILED DESCRIPTION

Figure 1:
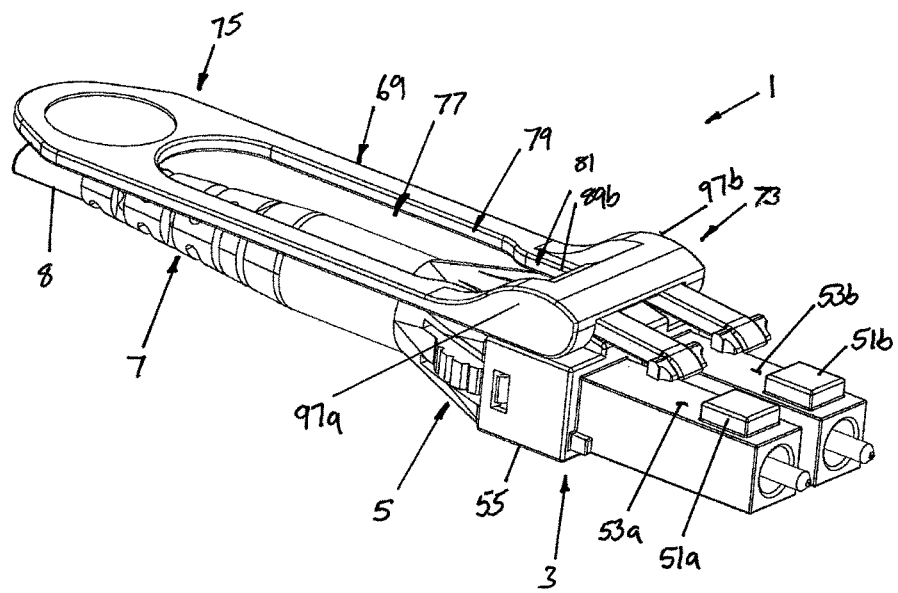
FIG. 1 is an isometric view of a fibre optic connector assembly in accordance with a first embodiment of the invention.

FIG. 1 shows a fibre optic cable assembly 1 in accordance with the invention. The embodiment shown is in the form of a duplex fibre optic cable assembly 1.

The duplex fibre optic cable assembly 1 includes a connector unit 3, a housing 5, a boot 7, and a fibre optic cable 8.

The housing 5 comprises first and second parts 11,13 that are arranged to snap fit together in a releasable manner via snap fit connectors. The housing 5 includes a trailing end aperture 15, which receives a crimp stud 16 which is attached to one end of the fibre optic cable 8; and first and second leading end apertures 17a,17b. A section of the fibre optic cable 8 is housed within the housing 5. The cable is inserted into the housing via the trailing end aperture 15. The boot 7 overlies a portion of the cable and a trailing portion 21 of the housing.

The cable furcates inside the housing into first and second optical fibres (not shown) adjacent furcation member 13a.

The first optical fibre exits the housing 5 via the first aperture 17a in the leading end and the second optical fibre exits the housing 5 via the second aperture 17b in the leading end. The first optical fibre is a receiving fibre (A) and the second optical fibre is a transmitting fibre (B).

The first optical fibre is threaded into a first bore 23a formed in a first inner body 25a and the end of the fibre is connected to a first ferrule 27a. The first inner body 25a protrudes from the housing 5 via the first aperture 17a. The arrangement is such that when the first part of the housing 11 is separated from the second part of the housing 13 the first inner body 25a is removable from, and insertable into, the housing 5. The connection between the first inner body 25a and the housing 5 is such that the orientation of the first inner body 25a is fixed with respect to the housing. The first inner body 25a includes first and second shoulder portions 27a,29a. The first shoulder portion 27a is inserted into a slot 31a formed adjacent the first aperture 17a. This retains the rotational orientation and translational position of the first inner body 25a with respect to the housing 5. The second shoulder portion 29a abuts an outer surface of the housing 5 and assists in maintaining the alignment of the first inner body 25a with respect to the housing 5.

The first ferrule 33a protrudes out of the bore 23a formed in the first inner body 25a. A first spring 28a is located in the first bore 23a and biases the first ferrule 33a towards the distal end of the first inner body 25a.

The second optical fibre is threaded into a bore 23b formed in a second inner body 25b. The end of the second optical fibre is connected to a second ferrule 33b, which protrudes from the bore 23b. The second inner body 25b protrudes from the housing 5 via the second aperture 17b. The second inner body 31b is attached to the housing 5 in a similar fashion to the first inner body 25a, wherein a first shoulder portion 27b is inserted into a slot 31a adjacent the second aperture 17b. A second spring 28b is located in the second bore 23b and biases the second ferrule 33b towards the distal end of the second inner body 25b.

When the first part of the housing 11 is fitted to the second part of the housing 13, the first and second inner bodies 25a,25b are held firmly in the housing 5 such that they protrude through the first and second apertures 17a,17b respectively.

The housing 5 and first and second inner bodies 25a,25b form a housing assembly.

The connector unit 3 is releasably attachable to the housing assembly. The housing 5 includes side walls 35a, 35b. Each of the side walls 35a,35b includes a latch 37a,37b formed integrally therewith. Each latch 37a,37b is resilient, and is attached to its respective side wall 35a,35b in a cantilevered manner. Each latch 37a,37b includes a pressing part 39a,39b and a latching part 41a,41b. Each latching part 41a,41b is arranged to engage with a respective latching formation 43a,43b on the connector unit 3 in order to attach the connector unit 3 to the housing assembly. The connector unit 3 can be separated from the housing assembly by depressing the pressing parts 39a,39b, which moves the latching part 41a,41b out of engagement with its respective latching formation 43a,43b on the connector unit 3.

The housing 5 has a tapered trailing end. This allows easier access to the latches 37a,37b.

The connector unit 3 includes first and second fibre optic connectors 45a,45b. The first and second fibre optic connectors 45a,45b are preferably compatible with the LC format, however other configurations are possible.

When mounted on the housing assembly, the connector unit 3 provides an outer casing that houses the inner bodies 25a,25b, and optionally can be arranged to house at least a part of the housing 5.

Each of the first and second fibre optic connectors 45a, 45b includes a body 47a,47b having a cavity 49a,49b that is arranged to receive one of the inner bodies 25a,25b, when the connector unit 3 is attached to the housing assembly. The arrangement is such that, when the connector unit 3 is mounted to the housing assembly, each body 47a,47b houses one of the inner bodies 25a,25b. The ferrule 33a,33b protrudes out of its respective body 47a,47b via an aperture 48a,48b, which is aligned with the longitudinal axis of the body 47a,47b.

Each of the first and second fibre optic connectors 45a, 45b includes a guide element 51a,51b. The guide element 51a,51b is located towards a leading end 80 of the fibre optic connector 45a,45b. Preferably each guide element 51a,51b is in the form of a substantially cuboid block of material, which is located on an upper surface 53a,53b of the connector body 47a,47b. The guide element 51a,51b is arranged to engage with a guide formation, such as a recess or slot, in a socket 100, for example in a patch panel or adapter.

The connector unit 3 includes a connector part 56 that is arranged to connect the first and second fibre optic connectors 45a,45b together. The first and second fibre optic connectors 45a,45b are arranged substantially parallel with one another, and protrude outwardly from the connector part 56, in a forwardly direction. Preferably, the connector part 56 is formed integrally with the first and second fibre optic connectors 45a,45b.

The connector part 56 includes a cavity 57 and an open-side 59, which provides a docking bay at the rear of the connector unit 3. This enables the connector unit 3 to be mounted onto the leading end of the housing 5, at least a part of the housing 5 being insertable into the cavity 57 via the open-side 59. The connector unit 3 includes the latching formations 43a,43b that are arranged to engage with respective latching parts 41a,41b included in the housing 5, thereby releasably locking the connector unit 3 to the housing 5.

Figure 2:
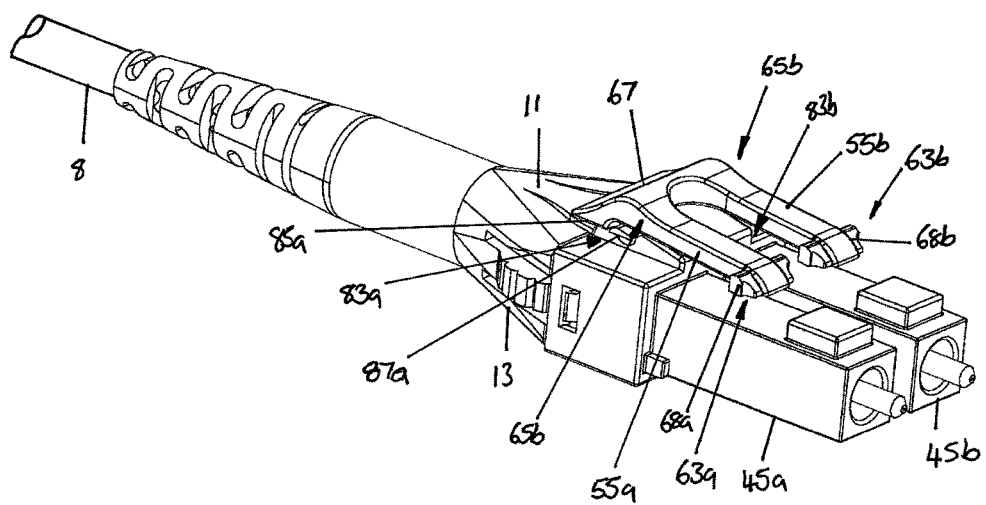
FIG. 2 is an isometric view of part of the embodiment of FIG. 1, having an actuator tab removed for clarity.
Figure 3:
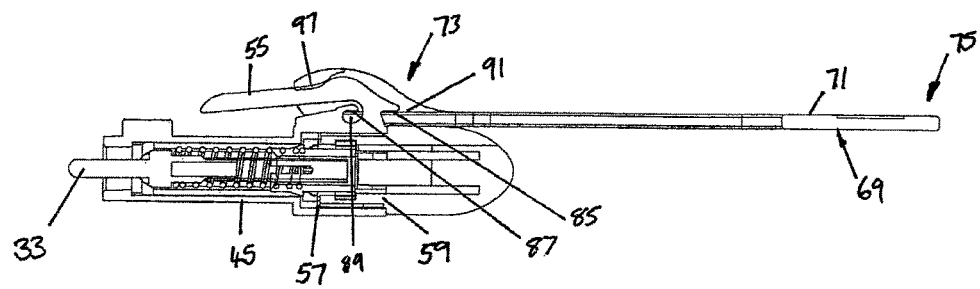
FIG. 3 is a longitudinal vertical cross-section of the embodiment of FIG. 1 through a ferrule.
Figure 4:
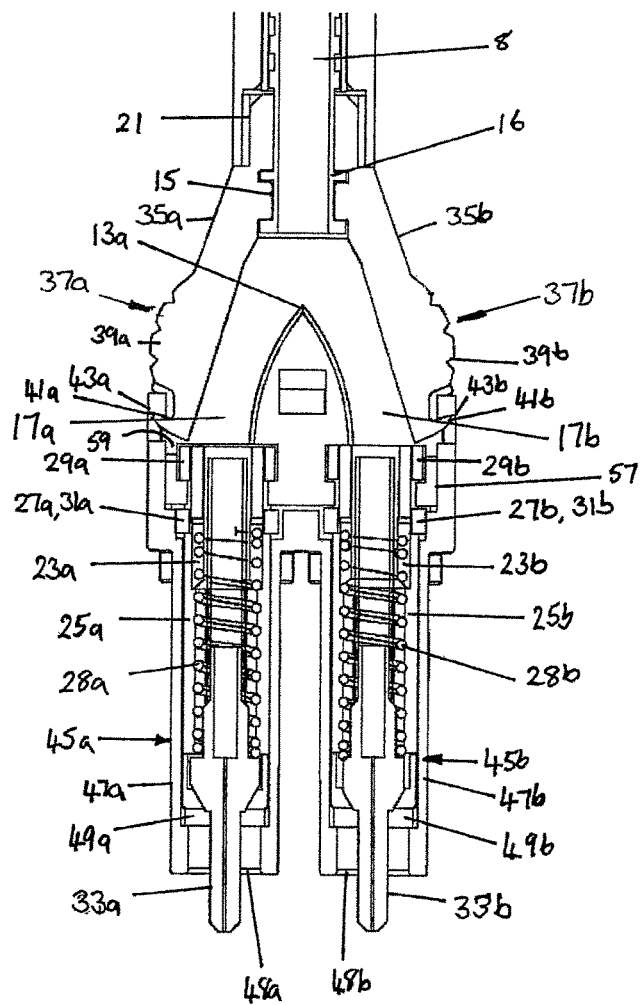
FIG. 4 is a longitudinal horizontal cross-section of the embodiment of FIG. 1 through both ferrules.

The connector unit 3 includes first and second latching levers 55a,55b, which are associated with the first and second connectors 45a,45b respectively. Each latching lever 55a,55b is mounted on the connector unit 3 in a cantilevered fashion. The latching levers 55a,55b are preferably mounted on the connector part 56, however the latching levers can alternatively be mounted on their respective connectors 45a,45b. Each latching lever 55a,55b has a leading end 63a,63b and a trailing end 65a,65b, with respect to the insertion direction of the fibre optic connector. The leading end 63a,63b is the end which is inserted first into the socket 100. Each latching lever 55a,55b is cantilevered at, or towards, its trailing end 65a,65b; the trailing end 65a,65b protruding from a lever mounting formation 67 (see FIG. 2). The mounting formation 67 is located at a trailing end 82 of the connector unit 3.

The leading end 63a,63b of each latching lever 55a,55b is unrestrained. The leading end 63a,63b includes a latching formation 68a,68b for engaging with a latching formation 102 in the socket 100 (see FIG. 6D).

Each latching lever 55a,55b extends over at least a part of its respective connector body 47a,47b, and is arranged substantially in line with the longitudinal axis of its respective body 47a,47b. Preferably the length of each lever 55a,55b is such that the leading end 63a,63b does not protrude beyond the end of the respective connector body 47a,47b, and more preferably does not overlie its respective guide element 51a,51b. Each latching lever 55a,55b is preferably downwardly inclined towards its respective body 47a,47b to ensure that the connector can be inserted into the socket 100, without snagging.

While the connector unit 3 is typically made from a plastics material, for example by injection moulding, the latching levers 55a,55b behave in a resilient fashion when moving between locking and non-locking positions. It also allows the levers 55a,55b to automatically engage a latching formation when the device is inserted into the socket 100.

The device further includes a manually operable control 69 that is arranged to actuate the latching levers 55a,55b substantially simultaneously. The manually operable control 69 is moveably mounted to the connector unit 3. The control 69 is arranged to slide with respect to the connector unit 3 between a first position wherein the levers 55a,55b are in a locking condition to a second position wherein the levers 55a,55b are in an unlocked condition. Thus by sliding the control 69 with respect to the connector unit 3, it is possible to unlock the device, and remove it from the socket 100.

The control 69 preferably comprises an elongate body 71 having a first (leading) end 73 and a second (trailing) end 75. An elongate body 71 is useful in high density packing arrangements where it can be difficult to grip the control. At least a portion of the body 71, preferably towards the second end, is relatively flat and/or thin. The length of the elongate body 71 is such that it extends over and beyond the housing 5, and typically overlies at least a portion of the boot. This provides easier access to the user for actuation purposes. Typically the length of the control is greater than 30 mm. Preferably the length of the control is less than 100 mm, and more preferably is less than 70 mm.

The body has a slot-shaped through hole 77. The hole enables the control 69 to be mounted onto the connector unit 3, and is preferably releasably attached to the connector unit 3. The hole 77 has a first portion 79 that is sufficiently large, for example sufficiently wide, to enable to the elongate body 71 to fit over at least a portion of the lever mounting formation 67. The hole 77 has a second portion 81 that is narrower than the first portion, and is arranged to engage the lever mounting formation 67.

At least one driving surface 97 is provided at the leading end 73, which is arranged to interact with the latching levers 55a,55b. The driving surface 97 is vertically offset from the plane of the slot-shape through hole 77. The driving surface 97 is joined to the remainder of the body 71 by protrusions 97a,97b, which support the driving surface at each end. The longitudinal axis of the driving surface 97 is arranged substantially perpendicularly to the longitudinal axis of the slot-shaped through hole 77.

The lever mounting formation 67 includes recessed portions 83a,83b, which are located towards the bottom of the formation, and engagement surfaces 85a,85b;87a,87b. The elongate body 71 includes engagement members 89a,89b, in the form of ribs, which locate in the recessed portions 83a,83b respectively. The engagement members 89a,89b are edge portions of the second portion 81 of the slot-shaped through hole. The engagement surfaces 85a,85b;87a,87b, which face downwards, engage with the upper surface 91 of the elongate body 71 in the vicinity of the engagement members 89a,89b.

During assembly, the control 69 is mounted over the lever mounting formation 67 via the first portion 79 of the hole 77, and is moved to an operational position by pulling the control 69 rearwards so that the lever mounting formation engages with second, narrower, portion 81 of the hole.

Figures 6A, 6B:
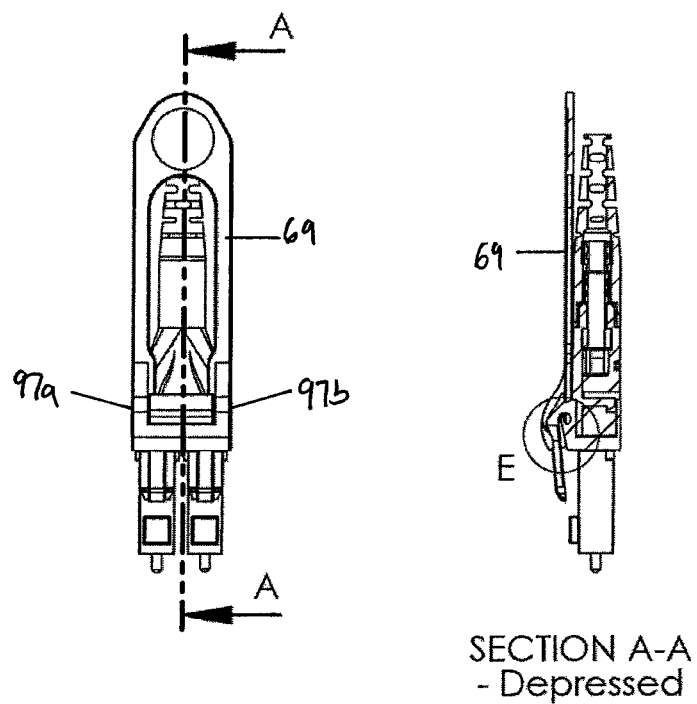
FIG. 6A is a plan view of the embodiment of FIG. 1, indicating a section line A-A.
FIG. 6B is a cross-sectional view along section line A-A, indicating detail E.
Figure 6C:
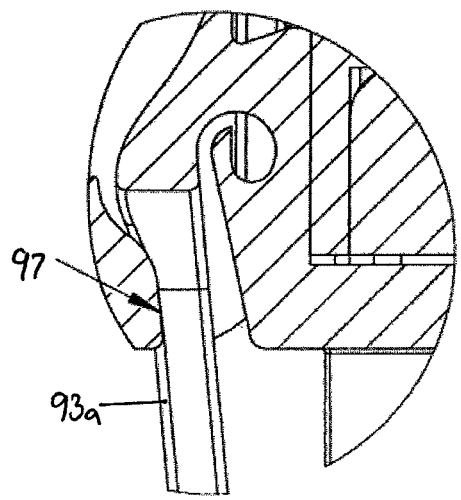
FIG. 6C is an enlarged view of detail E from FIG. 6B.

The control 69 is arranged to slide with respect to the lever mounting formation 67, a limited amount, to actuate the latching levers 55a,55b. The longitudinal axis of the driving surface 97 is arranged transversely to the longitudinal axes of the latching levers 55a,55b. The driving surface 97 is located above the latching levers 55a,55b. The driving surface 97 acts on the upper surface 93a,93b of each of the latching levers 55a,55b. The latching levers 55a,55b are located between the protrusions 97a97b The driving surface 97 includes a recessed portion 97a to accommodate a root portion 98 of the latching lever (see FIG. 6C).

Figures 5A, 5B:
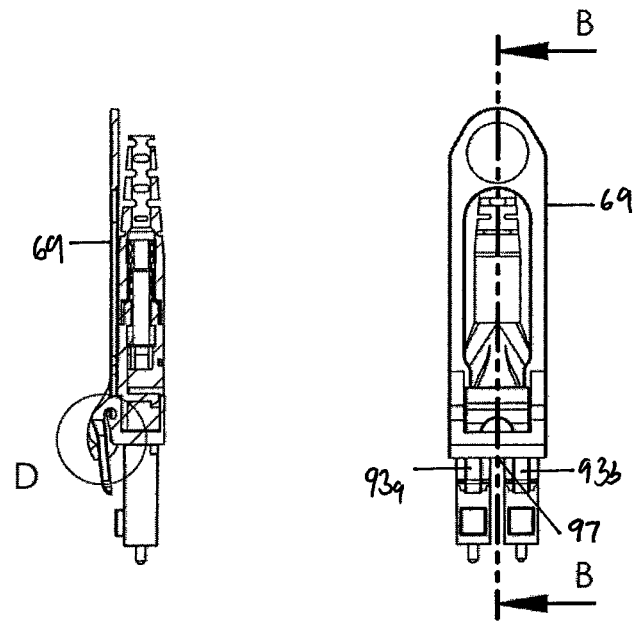
FIG. 5A is a plan view of the embodiment of FIG. 1, indicating a section line B-B, wherein latching levers are in a first, locking, position.
FIG. 5B is a cross-sectional view along section line B-B, indicating detail D.
Figure 5C:
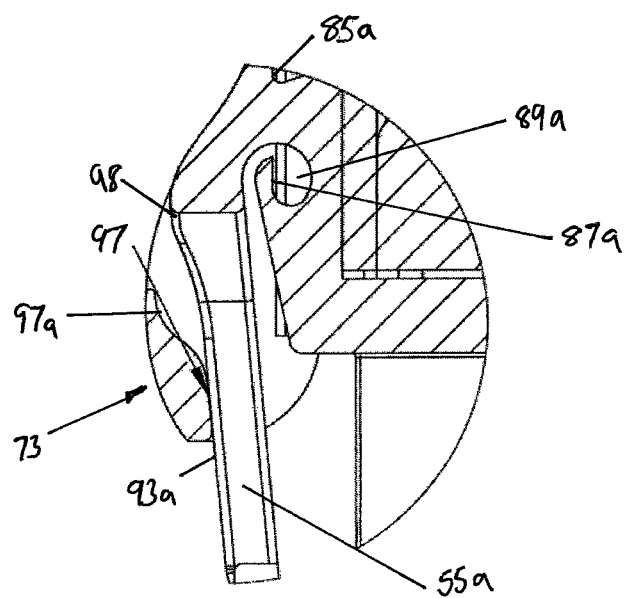
FIG. 5C is an enlarged view of detail D from FIG. 5B.
Figure 6D:
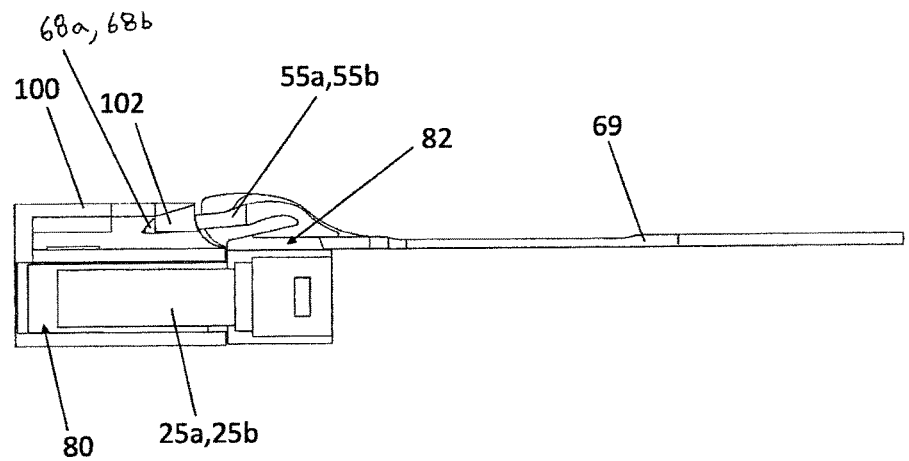
FIG. 6D is a diagrammatic sectional view of a front end of the fibre optic connector assembly of FIG. 1 inserted into a receiving socket (the rear portion is omitted for clarity purposes), with a latching lever in a locking position.
Figure 6E:
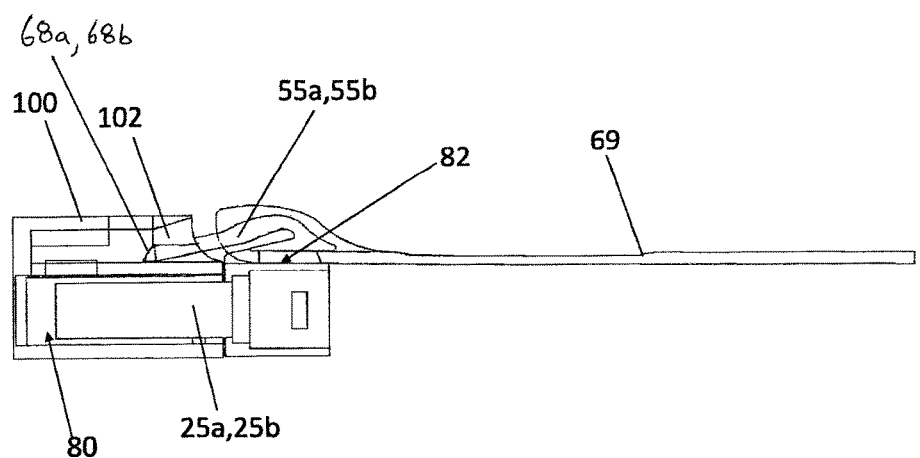
FIG. 6E is a diagrammatic sectional view of a front end of the fibre optic connector assembly similar to FIG. 6D except that the control is pulled reward thereby moving the latching lever to an unlocked position to enable the fibre optic connector assembly to be removed from the receiving socket.
Figure 7:
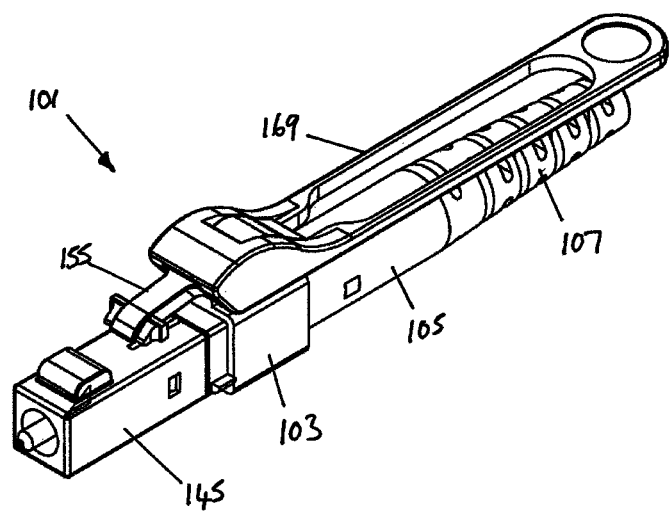
FIG. 7 is an isometric view of a fibre optic connector assembly in accordance with a second embodiment of the invention.
Figure 8:
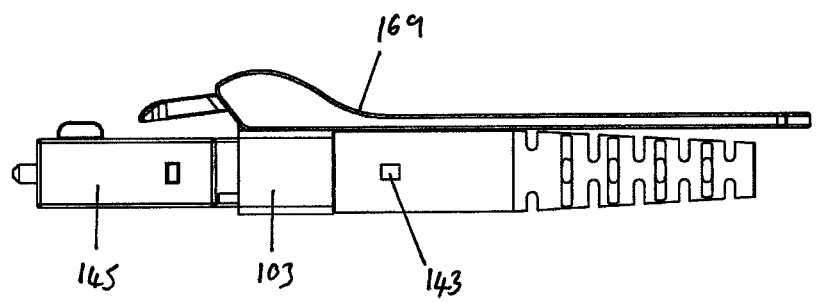
FIG. 8 is side view of the embodiment of FIG. 7.
Figure 9A:
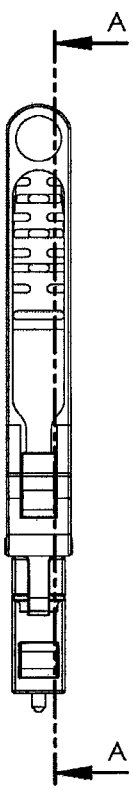
FIG. 9A is a plan view of the embodiment of FIG. 7, indicating a section line A-A.
Figure 9B:
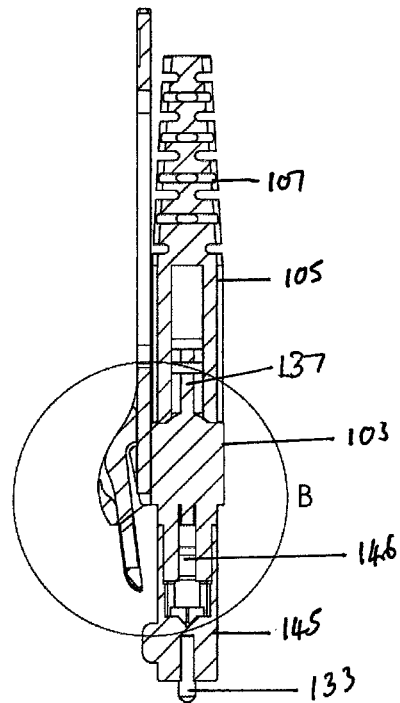
FIG. 9B is a cross-sectional view along section line A-A, indicating detail B.
Figure 9C:
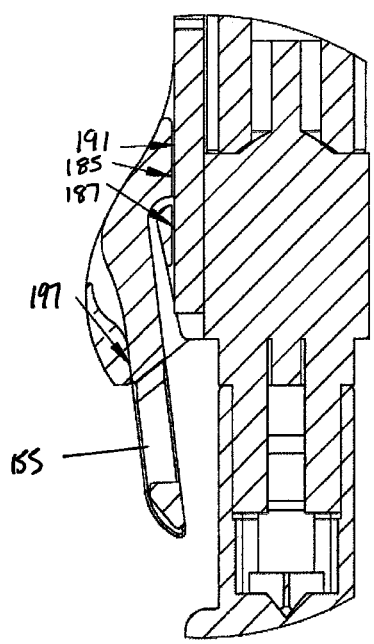
FIG. 9C is an enlarged view of detail B from FIG. 9B.
Figure 10:
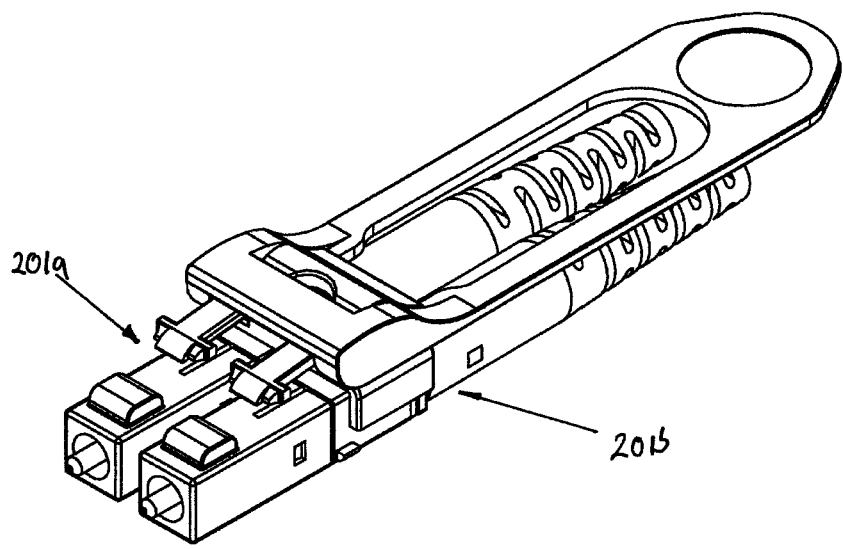
FIG. 10 is an isometric view of a fibre optic connector assembly in accordance with a third embodiment of the invention.
Figure 11:
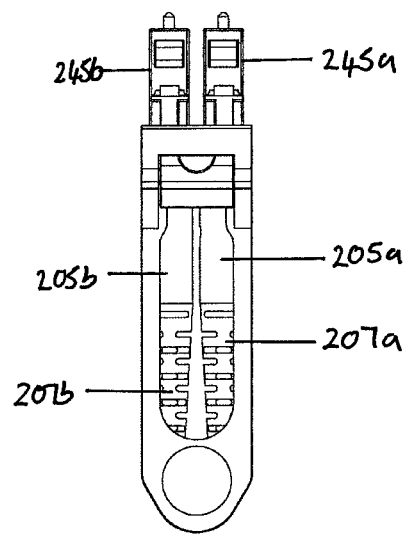
FIG. 11 is a plan view of the embodiment of FIG. 10.
Figure 12:
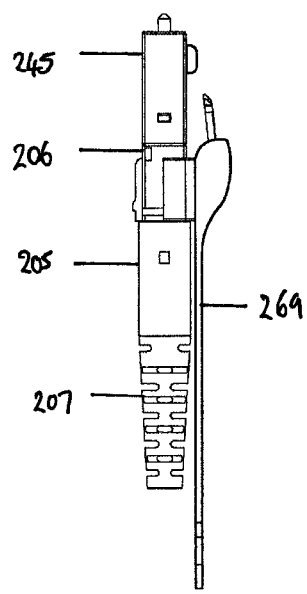
FIG. 12 is a side view of the embodiment of FIG. 10.
Figure 13:
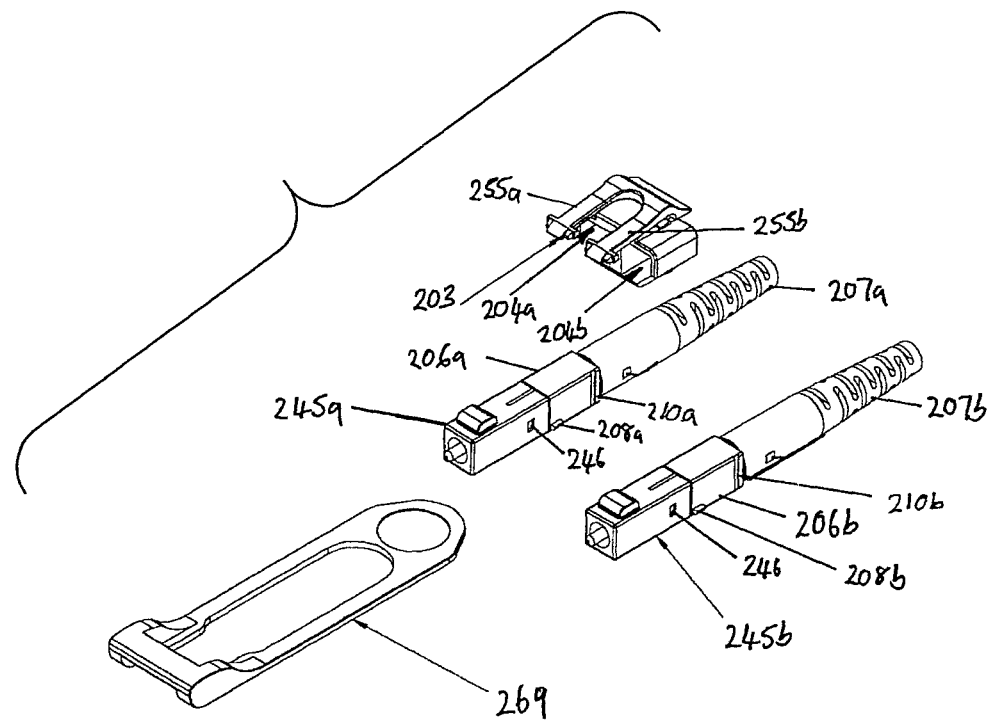
FIG. 13 is a partially exploded view of the embodiment of FIG. 10.
Figure 14A:
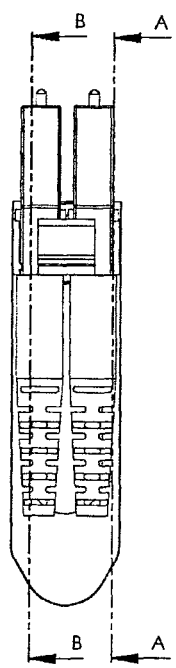
FIG. 14A is a plan view of the embodiment of FIG. 10, indicating section lines A-A and B-B.
Figures 14B, 14C:
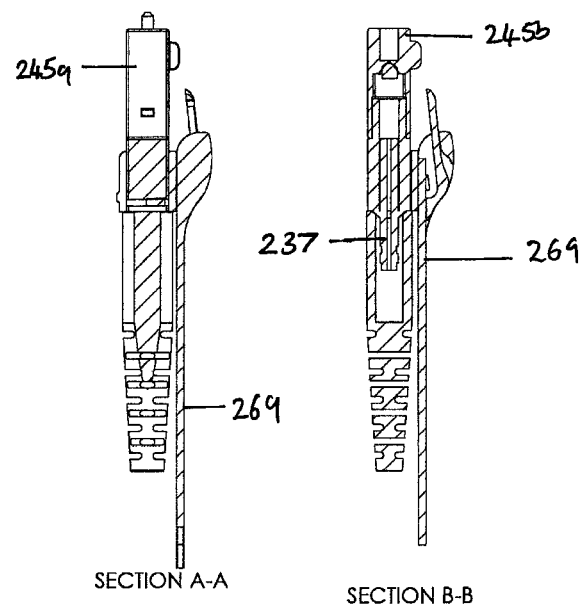
FIG. 14B is a cross-sectional view along section line A-A.
FIG. 14C is a cross-sectional view along section line B-B.

When the control 69 is not actuated, the latching levers 55a,55b are in a first position, which is a locking position (see FIGS. 5A to 5C). FIG. 6D shows a leading end of the fibre optic cable assembly inserted into the receiving socket 100. The latching levers 55a,55b engage with latching formation 102 of the receiving socket 100 to retain the assembly within the receiving socket 100. The latching levers 55a,55b are depressed, and hence moved to a second, non-locking, position by moving the control 69 in a rearward direction, for example by a user manually pulling on the control in a substantially rearward longitudinal axial direction (see FIGS. 6A to 6C). This enables the connector to be removed from its socket 100. This is shown in FIG. 6E.

The movement of the control in the rearward direction is limited by the driving surface 97 interacting with the latching levers 55a,55b.

When the control 69 is released, the resiliency of the latching levers 55a,55b returns the latching levers to the first (locking) position (see FIGS. 5A to 5C).

The sliding motion of the control is supported by the interaction of the control 69 with the engagement surfaces 85a,85b;87a,87b, and by the interaction of the driving surface 69 on the latching levers 55a,55b.

The control 69 includes a recess 95, preferably a concave recess, on its upper surface for receiving a label.

When gripping the control, the user can put finger into slot-shaped hole 77 or grip the recessed portion 95.

A method for changing the polarity of the first and second optical fibres with respect to the first and second fibre optic connectors 45a,45b will now be described.

When the connector unit 3 is mounted onto the housing assembly, the first and second inner bodies 25a,25b slide into their respective cavities 49a,49b, and the ferrules 33a, 33b protrude from their respective apertures 48a,48b.

The connector unit 3 is detachable from the housing 5 by the user operating the latches 37a,37b. This disengages the latching parts 41a,41b from the latching formations 43a,43b and enables the connector unit 3 to slide off the housing 5 and inner bodies 25a,25b. Thus the connector unit 3 is fully separable from the housing assembly.

When the connector unit 3 is separated from the housing assembly, the orientation of the connector unit 3 with respect to the housing assembly can be adjusted, for example the connector unit 3 can be inverted with respect to the housing assembly (rotated through 180 degrees about the insertion axis), and the connector unit 3 can be reattached to the housing assembly in the new orientation. The result of this is that, if in the original orientation the first inner body 25a was located within the first connector 45a and the second inner body 25b was located in the second connector 45b, in the new orientation the first inner body 25a is located in the second connector 45b and the second inner body 25b is located in the first connector 45a. This changes the polarity of the first and second optical fibres with respect to the first and second fibre optic connectors 45a,45b.

Similarly, if in the original orientation the second inner body 25b was located within the first connector 45a and the first inner body 25a was located in the second connector 45b, in the new orientation the first inner body 25a is located in the first connector 45a and the second inner body 25b is located in the second connector 45b. This changes the polarity of the first and second optical fibres with respect to the first and second fibre optic connectors 45a,45b.

Thus a user is able to easily change the polarity of the duplex fibre optic cable assembly by simply removing the connector unit 3 and changing its orientation with respect to the housing assembly, thereby changing the polarity of the transmitting and receiving fibre optic cables with respect to the complementary connector.

It will be appreciated by the skilled person that it is possible to change the orientation of the connector unit 3 with respect to the housing by rotating the housing 5 instead of the connector unit 3. That is, the orientation of the connector unit 3 is held fixed, but the orientation of the housing assembly is changed. It is of course preferred to change the orientation of the connector unit 3 since adjusting the orientation of the housing assembly may stress the fibres.

FIGS. 7 to 9C show a second embodiment of the invention. The second embodiment is a simplex fibre optic connector assembly 101.

The second embodiment includes a connector unit 103, a housing 105, a boot 107, and a fibre optic cable (omitted for clarity).

The second embodiment is similar to the first embodiment, however the connector unit 103 includes only one fibre optic connector 145, and therefore there is only one latching lever 155. The control 169 is adapted accordingly. Otherwise the way in which the latching lever is mounted and actuated is similar to the first embodiment. For example, the control 169 includes a driving surface 197 for actuating the latch 155, and the upper surface 191 of the control engages with surfaces 185,187 when sliding.

There are some further constructional differences, which affect the way in which the second embodiment is manufactured and assembled. For example, the connector unit 3 includes latches 137 for releasably connecting the connector unit 103 to the housing 105, and the housing 105 includes latching formations 143. The connector 145 is releasably attachable to connector unit 103 via a further latching arrangement 146. Since this is a simplex arrangement, the fibre optic cable is not furcated in the housing 105.

The position of the ferrule 133 is fixed relative to the fibre optic connector 145, and therefore no spring is required.

FIGS. 10 to 14C shows a third embodiment of the invention. The third embodiment is a duplex fibre optic cable assembly 201.

The third embodiment includes first and second fibre optic cable sub-assemblies 201a,201b; a connector unit 203; and a manually operable control 269.

The first and second fibre optic cable sub-assemblies 201a,201b each include a first housing 205a,205b; a second housing 206a,206b; a boot 207a,207b; and a fibre optic connector 245a,245b, each having a guide element 251a, 251b.

Each first housing 205a,205b is releasably attachable to its respective second housing 206a,207b via a latching arrangement 237. Each second housing 206a,207b is releasably attachable to its respective connector 245a,245b via a latching arrangement 246.

The connector unit 203 is arranged to releasably connect the first and second fibre optic cable assemblies 201a,201b together. When connected together, the longitudinal axes of the first and second fibre optic cable assemblies are arranged substantially parallel with one another. The connector unit 203 clips onto the first fibre optic cable assembly 201*a*, preferably by engaging the second housing 206*a*, via a first attachment formation 204*a*. The connector unit 203 clips onto the second fibre optic cable assembly 201*b*, preferably by engaging the second housing 206*b*, via a second attachment formation 204*b*.

Front and rear protrusions 208*a*,208*b*;210*a*,210*b* lock the axial position of the connector unit 203 with respect to the first and second fibre optic connector assemblies 201*a*,201*b*.

The connector unit 203 includes first and second latching levers 255*a*,255*b*, which are associated with the first and second connectors 245*a*,245*b* respectively. The latching levers 225*a*,225*b* are arranged in a similar fashion to the latching levers 55*a*,55*b* from the first embodiment.

The assembly includes a manually operable control 269 for actuating the latching levers 225*a*,225*b*. The control 269 has a similar structure and mode of operation to the control 69 in the first embodiment.

An advantage of this embodiment is that it is easy to change the polarity of the first and second fibre optic cable assemblies 201*a*,201*b* with respect to the connector unit 203. This is achieved by unclipping the cable assemblies 201*a*,201*b* from their original attachment formations 204*a*, 204*b* and reattaching the cable assemblies 201*a*,201*b* in a different (the other) attachment formation 204*a*,204*b*. For example, if the first cable assembly 201*a* is mounted in the first attachment formation 204*a*, and the second cable assembly 201*b* is mounted in the second attachment formation 204*b*, to change the polarity second cable assembly 201*b* is attached to the connector unit 203 via the first attachment formation 204*a*, and the first cable assembly 201*a* is attached to the connector unit 203 via the second attachment formation 204*b*. Similarly, if the second cable assembly 201*b* is mounted in the first attachment formation 204*a*, and the first cable assembly 201*a* is mounted in the second attachment formation 204*b*, to change the polarity second cable assembly 201*b* is attached to the connector unit 203 via the second attachment formation 204*b*, and the first cable assembly 201*a* is attached to the connector unit 203 via the first attachment formation 204*a*.

It will be apparent to the skilled person that modifications can be made to the above embodiments that fall within the scope of the invention, for example while the embodiments described with reference to a to duplex fibre optic cables, its general teachings are applicable to fibre optic cable assemblies having at least two optical fibres.

Instead of using fibre optic connectors which are arranged to be compatible with LC sockets, other fibre optic connector formats can be used, for example the connectors can be arranged to be compatible with E2000 sockets.

A first mounting can be provided for the manually operable control and a second mounting can be provided for the or each latch.

The invention claimed is:

1. A fibre optic cable assembly, comprising: a mounting; at least one fibre optic connector arranged for insertion into a receiving socket, said connector including a leading end and a trailing end with respect to a direction of insertion of the connector into the receiving socket; at least one latch arranged for insertion into the receiving socket, the at least one latch having an engagement formation that is arranged to releasably engage a latching formation within the receiving socket thereby releasably locking the fibre optic connector to the receiving socket, said latch including a leading end and a trailing end with respect to the direction of insertion of the connector into the receiving socket, wherein said latch is cantilevered towards its trailing end, the arrangement being such that the trailing end of said latch is fixed, the leading end of said latch is moveable with respect to the trailing end of said latch, and the engagement formation protrudes substantially perpendicularly outwards at the leading end of the latch; and a manually operable control slidably attached to the mounting, wherein said control engages the at least one latch and is slidable in a direction substantially opposite to the insertion direction to move said latch to a non-locking position.

2. An assembly according to claim 1, wherein the at least one latch is cantilevered at, or adjacent, the trailing end of the fibre optic connector.

3. An assembly according to claim 1, wherein the at least one latch is cantilevered to the mounting.

4. An assembly according to claim 1, wherein the mounting is located at, or adjacent, the trailing end of the fibre optic connector.

5. An assembly according to claim 3, wherein the control is slidably attached to the mounting at a level below the level at which said latch is cantilevered to the mounting.

6. An assembly according to claim 1, wherein the control includes a driving member having a driving surface, which is arranged to depress the at least one latch in response to a user slidably moving the control.

7. An assembly according to claim 6, wherein the driving member extends transversely across the leading end of the control, and the driving surface is located at, or adjacent to, a leading end of the control.

8. An assembly according to claim 6, wherein the control is slidably attached to the mounting at a level below the level at which the driving surface engages the latch.

9. An assembly according to claim 1, wherein the control is releasably attachable to the mounting.

10. An assembly according to claim 1, wherein one of the control and the mounting includes at least one recess, and the other of the control and the mounting includes at least one rib, wherein the recess and the rib interact to provide guided sliding movement of the control relative to the mounting.

11. An assembly according to claim 1, wherein the mounting includes at least one downwardly facing engagement surface that is arranged to engage with an upper surface of the control.

12. An assembly according to claim 1, wherein the control includes a slot-shaped through hole.

13. An assembly according to claim 12, wherein at least a part of the mounting protrudes through the slot-shaped through hole.

14. An assembly according to claim 12, wherein the slot-shaped through hole includes first and second portions, wherein the width of the first portion is greater than the width second portion.

15. An assembly according to claim 14, wherein the control is mounted onto the mounting via the first portion of the slot-shaped through hole.

16. An assembly according to claim 14, wherein edge portions of the slot shaped through hole engage with recesses formed in the mounting, and the sliding interaction between the control and the mounting is provided by edge portions of the slot-shaped through hole.

17. An assembly according to claim 14, wherein the second portion of the slot-shaped hole is located towards a leading end of the control.

18. An assembly according to claim 1, wherein the control is arranged to slide in a direction that is substantially parallel with at least one of a longitudinal axis of the fibre optic cable assembly and an insertion axis of the fibre optic cable assembly.

19. An assembly according to claim 1, wherein said latch is resilient, and the resiliency of said latch urges the control towards the locking position.

20. An assembly according to claim 1, wherein said latch is inclined from the cantilevered end towards the fibre optic connector.

21. An assembly according to claim 1, wherein said fibre optic connector includes a guide element located towards its leading end.

22. An assembly according to claim 1, including a second fibre optic connector and a second latch arranged to engage the receiving socket and releasably lock the fibre optic connector to the receiving socket, wherein the second latch includes a leading end and a trailing end with respect to the direction of insertion of the connector into the receiving socket, and is cantilevered towards its trailing end, the arrangement being such that the trailing end of the latch is fixed and the leading end of the latch is moveable with respect to trailing end of the latch.

23. An assembly according to claim 22, wherein the control is arranged to move each of the first and second latches from a locking position to a non-locking position in response to a user moving the control in a direction opposite to the insertion direction.

24. An assembly according to claim 22, including a connector unit which connects the first and second fibre optic connectors together.

25. An assembly according to claim 24, wherein said latch is cantilevered to the connector unit.

26. An assembly according to claim 24, wherein the control is slidably attached to the connector unit.

27. An assembly according to claim 24, including a housing assembly comprising a housing, a first inner body, and a second inner body; and a fibre optic cable attached to the housing, wherein fibres from the cable are furcated within the housing such that at least one fibre is located in the first inner body and at least one fibre is located in the second inner body, and wherein the connector unit is releasably attachable to the housing assembly in at least first and second orientations.

28. An assembly according to claim 27, wherein the arrangement is such that in the first orientation the first connector is mounted over the first inner body and the second connector is mounted over the second inner body, thereby providing the first and second connectors with a first polarity with respect to the fibres in the first and second inner bodies, and in the second orientation the first connector is mounted over the second inner body and the second connector is mounted over the first inner body, thereby providing the first and second connectors with a second polarity with respect to the fibres in the first and second inner bodies, said second polarity being different from the first polarity.

29. An assembly according to claim 22, wherein the connector unit is arranged to releasably attach the first and second fibre optic connectors together.

30. An assembly according to claim 22, including a first fibre optic cable sub-assembly, which includes a first fibre optic cable and the first fibre optic connector; and a second fibre optic cable sub-assembly, which includes a second fibre optic cable and the second fibre optic connector, wherein the connector unit is arranged to releasably connect the cable sub-assemblies together.

31. An assembly according to claim 30, wherein the connector unit includes a first connector portion that is arranged to clip onto one of the first and second fibre optic cable sub-assemblies; and a second connector portion that is arranged to clip onto the other of the first and second fibre optic cable sub-assemblies.

32. An assembly according to claim 30, wherein the first and second connector portions are arranged to interchangeably receive the first and second fibre optic cable sub-assemblies.

33. An assembly according to claim 30, wherein the polarity of the first fibre optic cable sub-assembly with respect to the connector unit is adjustable by moving the first fibre optic sub-assembly from one of the first and second connector portions to the other of the first and second connector portions; and the polarity of the second fibre optic cable sub-assembly with respect to the connector unit is adjustable by moving the second fibre optic sub-assembly from one of the first and second connector portions to the other of the first and second connector portions.

34. An assembly according to claim 30, wherein the connector unit clips onto at least one of the first and second fibre optic cable sub-assemblies in a direction that is substantially orthogonal to the longitudinal axis of the sub-assembly.

35. An assembly according to any one of claim 30, wherein the connector unit is mounted substantially transverse to the longitudinal axis of at least one of the first and second fibre optic cable sub-assemblies.

36. A fibre optic cable assembly, comprising: a connector unit including:
  a mounting;
  a first fibre optic connector arranged for insertion into a first receiving socket, said first fibre optic connector having a leading end and a trailing end with respect to a direction of insertion of the connector into the first receiving socket, a first latch having a first engagement formation protruding substantially perpendicularly outwards from the first latch that is arranged to releasably engage a first latching formation within the first receiving socket to releasably lock the first fibre optic connector to the first receiving socket, said first latch including a leading end and a trailing end with respect to the direction of insertion, wherein the first latch is cantilevered towards its trailing end,
  a second fibre optic connector arranged for insertion into a second receiving socket, said second fibre optic connector having a leading end and a trailing end with respect to a direction of insertion of the connector into the second receiving socket, and a second latch having a second engagement formation protruding substantially perpendicularly outwards from the second latch that is arranged to releasably engage a second latching formation within the second receiving socket to releasably lock the second connector to the second receiving socket, said second latch including a leading end and a trailing end with respect to the direction of insertion, wherein the second latch is cantilevered towards its trailing end; and a control slidably attached to the mounting, said control being arranged to engage the first and second latches and move the first and second latches from locking positions to non-locking positions, wherein the control is slidable in a direction substantially opposite to the insertion direction to move the first and second latches to the non-locking positions.

37. The Assembly according to claim 36, wherein the first engagement formation protrudes substantially perpendicularly outwards at the leading end of the latch first latch and the second engagement formation protrudes substantially perpendicularly outwards at the leading end of the latch second latch.

38. A fibre optic cable assembly, comprising:
a first fibre optic cable sub-assembly, including a first fibre optic cable and a first fibre optic connector arranged for insertion into a first receiving socket, said first fibre optic connector having a leading end and a trailing end with respect to a direction of insertion of the connector into the first receiving socket; and
a second fibre optic cable sub-assembly, including a second fibre optic cable and a second fibre optic connector arranged for insertion into a second receiving socket, said second fibre optic connector having a leading end and a trailing end with respect to a direction of insertion of the connector into the second receiving socket, and
a connector unit arranged to releasably attach the first and second fibre optic cable sub-assemblies together, said connector unit including:
a mounting;
a first latch having a first engagement formation protruding substantially perpendicularly outwards from the first latch that is arranged to releasably engage a first latching formation within the first receiving socket to releasably lock the first connector to the first receiving socket, said first latch including a leading end and a trailing end with respect to the direction of insertion, wherein the first latch is cantilevered to the connector unit towards its trailing end, and
a second latch having a second engagement formation protruding substantially perpendicularly outwards from the second latch that is arranged to releasably engage a second latching formation within the second receiving socket to releasably lock the second connector to a second receiving socket, said second latch including a leading end and a trailing end with respect to the direction of insertion, wherein the second latch is cantilevered to the connector unit towards its trailing end; and
a control slidably attached to the mounting, said control being arranged to engage the first and second latches and move the first and second latches from locking positions to non-locking positions, wherein the control is slidable in a direction substantially opposite to a direction in which the first and second connectors are inserted into first and second receiving sockets, to move the latches to the non-locking positions.

39. The Assembly according to claim 38, wherein the first engagement formation protrudes substantially perpendicularly outwards at the leading end of the latch first latch and the second engagement formation protrudes substantially perpendicularly outwards at the leading end of the latch second latch.

\* \* \* \* \*